US011456584B1

(12) United States Patent
Taylor et al.

(10) Patent No.: US 11,456,584 B1
(45) Date of Patent: Sep. 27, 2022

(54) QUICK CONNECT GENERATOR CABLE

(71) Applicants: James A. Taylor, St. Petersburg, FL (US); Ivan B. Caruso, Clearwater, FL (US); Renee A. James Gilmore, Sarasota, FL (US)

(72) Inventors: James A. Taylor, St. Petersburg, FL (US); Ivan B. Caruso, Clearwater, FL (US); Renee A. James Gilmore, Sarasota, FL (US)

( * ) Notice: Subject to any disclaimer, the term of this patent is extended or adjusted under 35 U.S.C. 154(b) by 422 days.

(21) Appl. No.: 16/807,471

(22) Filed: Mar. 3, 2020

Related U.S. Application Data (60) Provisional application No. 62/815,080, filed on Mar. 7, 2019.

(51) Int. Cl.
*H02G 3/08* (2006.01)
*H02J 4/00* (2006.01)

(52) U.S. Cl.
CPC ............ *H02G 3/088* (2013.01); *H02J 4/00* (2013.01)

(58) Field of Classification Search
CPC .......... H02G 3/08; H02G 3/081; H02G 3/088; H02G 3/10; H05K 5/00; H05K 5/02; H05K 5/0004; H05K 5/0217; H05K 5/0247; H05K 5/04; H05K 7/00; H01R 13/46; H01R 13/516; H01R 13/52; H01R 13/53; H01R 13/533; H02J 4/00
USPC ....... 174/50, 480, 481, 520, 51, 559, 53, 59, 174/60; 220/3.2–3.8, 4.02; 361/600, 361/601, 602, 605, 641, 642, 659
See application file for complete search history.

(56) References Cited

U.S. PATENT DOCUMENTS

| | | | | |
|---|---|---|---|---|
| 4,413,307 A * | 11/1983 | Butte | ................ | H02B 1/21 361/675 |
| 6,184,461 B1 * | 2/2001 | Flegel | ................ | H01R 13/72 174/58 |
| 6,414,240 B1 * | 7/2002 | Flegel | ................ | H02G 3/00 174/50 |
| 8,415,561 B2 * | 4/2013 | Gates | ................ | H01R 13/748 174/59 |
| 8,559,167 B1 * | 10/2013 | Czarnecki | ................ | H02B 1/46 361/647 |
| 11,121,527 B2 * | 9/2021 | Miller | ................ | H02B 1/015 |
| 11,264,769 B1 * | 3/2022 | King | ................ | H01R 33/90 |

* cited by examiner

*Primary Examiner* — Angel R Estrada
(74) *Attorney, Agent, or Firm* — John Rizvi; John Rizvi, P.A.—The Patent Professor®

(57) ABSTRACT

A quick connect generator cable for coupling a generator to a main breaker panel for selectively supplying power to a plurality of circuit breakers in the panel for powering multiple loads found in residential or commercial buildings. The quick connect generator cable includes a power cable having a male connector for connection to a generator, and a switch housing for enclosing at least one breaker switch to selectively control power from the generator, a neutral and ground cable extending from the housing to electrically couple the generator to the main breaker panel, and power wires extending from the switch housing for powering the main breaker panel.

20 Claims, 6 Drawing Sheets

QUICK CONNECT GENERATOR CABLE

CROSS-REFERENCE TO RELATED APPLICATIONS

This application claims the benefit of U.S. provisional patent application No. 62/815,080, filed on Mar. 7, 2019, which is incorporated herein in its entirety.

FIELD OF THE INVENTION

The present invention relates generally to electrical cables, and more particularly, to a generator cable having a control switch for selectively coupling a generator to an electrical breaker box including a plurality of breakers for supplying power to various loads.

BACKGROUND OF THE INVENTION

A generator is an auxiliary power source that is often used to provide backup power when either a main utility power source is interrupted, or in remote locations where power is simply not available. The types of generators available on the market today typically include portable or standby generators. Portable generators generally comprise a small engine that is housed within a frame and operates on fuel, such as unleaded gas. Portable generators are often used on remote job sites, while camping, during recreational activities, or as a backup power source around the house. Standby generators are typically larger in size than the portable generators, employed in higher wattage applications, and operate on propane or natural gas. Such standby generators are typically secured on a solid foundation. There are cases when transfer switch systems are employed to automatically couple a generator to a power load upon the loss of the main utility power. For example, some transfer switch systems include electric sensors to sense the loss of utility power and to automatically connect a generator to various loads such as, for example, a HVAC system, fridge, freezer or for lighting systems used in homes or businesses. For health and safety purposes, generators are typically stored outside, away from residential or commercial dwellings or buildings allowing operating fumes to diffuse into the air. In some applications, generators are enclosed within a protective barrier to protect the generator from the elements, and to provide a sound barrier for damping the noise during use.

There is an ongoing need to use generators for supplying power to multiple loads typically found throughout residential or commercial buildings. In doing so, it is often the case where multiple extension cords are coupled between an auxiliary generator and various electrical devices, such as appliances, lighting systems, or HVAC systems. For example, using a generator to power various appliances or devices in a residence, or commercial building, generally requires that the person run multiple extension cords from the generator to each electrical appliance or device. Running a plurality of extension cords or cables through doorways, windows, or other access points in rooms or buildings exposes individuals to a hazardous risk, and poses a danger or security risk to the building as well. For example, exposure of cables or extensions cords running throughout a residence or building, poses a tripping hazard for residents, employees, or workers that might be walking around a job site. Also, the multitude of cables extending from the generator may make it difficult to determine what cable is attached to what load, resulting in cables being inadvertently unplugged from the generator, or providing an increased risk of potential shock to users regarding extension cords that are improperly installed. Most generators typically include an electrical panel having electrical control switches, status indicators, and receptacles for coupling electric power cables. Individuals often find themselves going outside to access the controls on the generator, or to unplug power cables from the generator to interrupt power to the loads. Many individuals simply unplug the extension cords directly at the load itself risking possible arching. In an effort to reduce the amount of cables connected directly to the generator, various applications have included the use of power bars or strips that include a series of receptacles for electrically attaching multiple cords. Many power bars include a single power switch that enables users to interrupt power to the bar and thus to the loads all at once. Some power bars include one metal oxide varistors or fuses to protect the loads from overcurrent or damage as a result of a power surge. In practice, most power bars can only accommodate several extension cords at a time, forcing users to use multiple power bars when having to power a plurality of loads. To interrupt the power source to multiple loads, individuals are faced with either accessing the generator to turn off the power, unplug each individual extension cord from the generator or at the load itself; or turn off the power directly at each power bar.

Connecting electrical extension cords or power bars to a generator may prove tolerable in situations where only a few devices require power, but using multiple extension cords is less efficient, dangerous, and ineffective when a generator is used to power a plurality of loads such as breakers provided in a main breaker box or panel typically provided in most establishments. For example, most electrical devices in a home or office building are electrically connected to a power source via, a main breaker box. The main breaker panel generally includes a plurality of circuit breakers used for safely interrupting power to each load when the loads draw too much current, or when conducting maintenance on the loads. The circuit breakers are typically selected according to voltage and amperage needs of the loads, and when demand on the loads requires too much current as a result of an overload or breakdown of the device, the breaker trips to interrupt the supply of voltage and current to the overdrawn load preventing damage and possible fire. In normal circumstances, the main utility power is electrically connected directly to the main breaker panel to supply the requisite power to the household devices. However, in situations where there is a power outage, or power is not available, there is a need to supply power to residential or commercial buildings that include main electrical breaker panels.

There is an ongoing desire to employ generators for supplying power to multiple loads powered by a main breaker panel, however, such task has proven difficult or complex at best. In many applications, a large power cable is hardwired directly into the main breaker panel establishing a permanent connection. As a result of the permanent connection, the power cable is not able to be quickly connected or disconnected from the breaker panel. Also, in situations where the breaker box or panel does not include a main power switch, individuals must control the supply of power to the breaker panel by accessing controls on the generator forcing users to go outside to either disconnect the generator, or access the on/off controls. Other conventional methods include the use of multiple power cables, junction or pullthrough boxes, and electronic control panels that are electrically connected to the generator and the main breaker panel for selectively supplying power. The added equipment requires extensive wiring thus increasing labor, time and costs. Other prior art power cables do not include a neural connection for effectively addressing the need to ground the neutral connection of a generator under certain conditions, do not include multiple breaker switches for selectively coupling a generator to a host of different loads, include non-standard design or specialized generator connectors, or provide simply provide limited use.

Accordingly, there is a need for a power generator cable used to easily and quickly couple a generator to an electrical breaker box, where the generator cable includes at least one breaker switch for selectively supplying power to the breaker box, a standard, non-specialized male connector adopted for connecting the cable to a variety of generators; and includes a neutral and ground cable for allowing grounding of the generator neutral in required applications.

SUMMARY OF THE INVENTION

The present invention is directed to a quick connect generator cable including at least one breaker switch, a neutral cable, and a ground cable, for selectively coupling an auxiliary source, such as a generator, to an electrical breaker panel having a plurality of circuit breakers for supplying power to multiple loads.

A first embodiment of the invention provides a quick connect generator cable electrically coupling a generator to a main breaker panel for selectively supplying power to a plurality of breakers enclosed within the main breaker panel. The quick connect generator cable comprises: a power cable including a plurality of electrical wires encased within a protective barrier, each of the plurality of wires including a sheath having an electrical color code; a male connector coupled to the distal end of the power cable and including electrical prongs where each of the plurality of electrical wires are electrically coupled to the electrical prongs; a switch housing including a top cable opening receiving a proximate end of the power cable, a first cable opening receiving one end of a neutral cable wire; a second cable opening receiving one end of a ground cable, and at least one bottom wire opening, where the neutral and ground cable is electrically connected to the electrical prongs; an electrical breaker switch housed within the switch housing, where the electrical breaker switch is electrically connected to at least one of the plurality of electrical wires; a first power wire connected to the electrical switch, and a second power wire connected to either the electrical switch, or directly to one of the electrical prongs where the power wires extend through the at least one bottom wire opening.

In a second aspect, the electrical breaker switch includes any one of a single pole-single throw, single pole double throw, double pole single throw, or double pole double throw switch. Alternatively, the breaker switch may comprise a switch specifically designed for a particular application.

In another aspect, the switch housing may include protective seals provided around the perimeter of each cable opening, and each wire opening to prevent water, dust or debris from entering the switch housing.

In still another aspect, the neutral cable and the ground cable includes a cable connector attached to the distal end of the neutral cable and the ground cable for electrically connecting the neutral and ground cable to the main breaker panel.

In another aspect, the male connector includes four electrical prongs designated for use with a generator rated at 30 amps, and adapted to attach to a female receptacle of a generator using a twist lock configuration.

In yet another aspect, each of the plurality of electrical wires is encased within a protective flexible sheath, or a rigid conduit having a predetermined length.

In another aspect, the breaker switch comprises a plurality of breaker switches each housed within the switch housing and electrically coupled to the plurality of electric wires, and the male connector, via, the electrical prongs.

In yet another aspect, a back wall of said switch housing includes at least one attachment for securely attaching said switch housing to a surface, said back wall being removably attached to the switch housing via, a fastener.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a quick connect generator cable including at least one breaker switch, a neutral cable, and a ground cable, for selectively coupling an auxiliary source, such as a generator, to a main electrical panel having a plurality of circuit breakers for powering multiple loads. The term, "generator" as used herein refers to any system or device that converts mechanical energy, wind energy, or sunlight into electrical energy.

Figure 1:
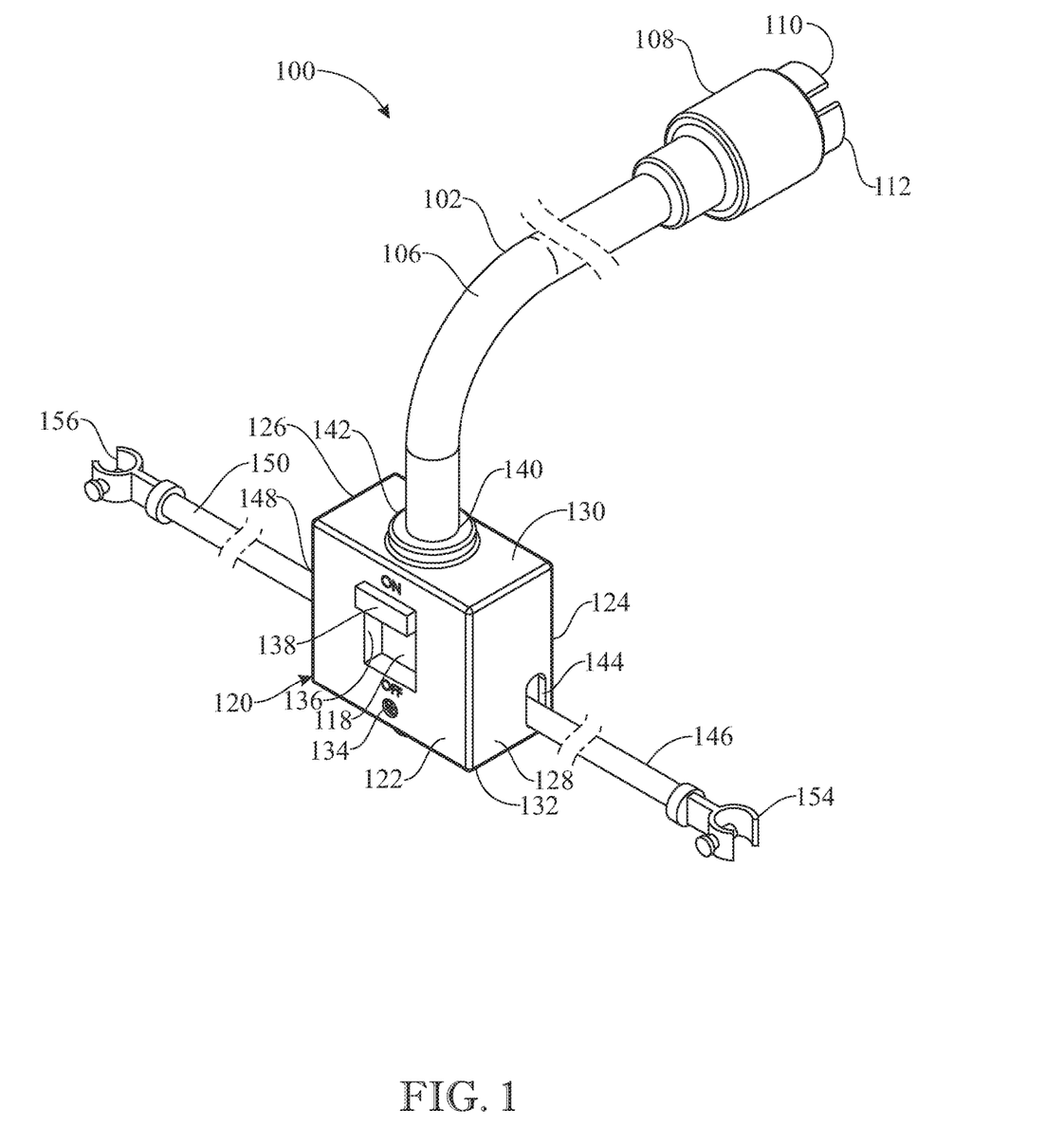
FIG. 1 is a front, perspective view of a quick connect generator cable, showing a generator power cable, a generator male connector attached to one end of the generator power cable, a switch housing provided at another end of the generator power cable, and a neutral and ground cable coupled to the switch housing, in accordance with an embodiment of the present invention.

Referring now to the drawings wherein like elements are represented by like numerals throughout, there is shown in FIG. 1 a quick connect generator cable 100 for electrically coupling an auxiliary power source, such as a generator, to a main breaker panel 200 (FIG. 5) including a plurality of circuit breakers, in accordance with an embodiment of the present invention. The generator cable 100 comprises a power cable 102 including a plurality of electrical wires 104 (better illustrated in FIG. 4) that each comprise a copper wire encased in a protective sheath or covering having a designated color in accordance with electrical standards or codes. The plurality of electrical wires 104 are also enclosed in a flexible, protective barrier 106, or alternatively, enclosed within a rigid conduit to protect the electrical wires 104 from exposure to damage. The rigid conduit may comprise any of copper, aluminum, or other metal or steel materials. The power cable 102 is generally selected in accordance with the National Electrical Manufactures Association, Underwriters Laboratories, or the Canadian Standards Association. A broken view of the power cable 102 supports the proposition that the cable may comprise different lengths to accommodate the electrical connection to generators that are distant from power loads.

A male connector 108 is attached to the distal end of the power cable 102 for electrically connecting to a female receptacle generally provided on housing of a portable or standby generator. Portable generators generally come in a variety of different amperage ratings including 15, 20 and 30 amps. As such, the type of male connector 108 chosen depends on the applicable amperage and voltage ratings of the generator and power load needs. In one embodiment, the male connector 108 comprises a common, twist lock NEMA L receptacle including L5, L10, or L14 rated for 125V/250V, and compatible with a L14-30P generator. The twist lock arrangement prevents the connector 108 from being pulled out of the female receptacle due to vibration of the generator during use, and to users pulling on the power cable 102.

Figure 2:
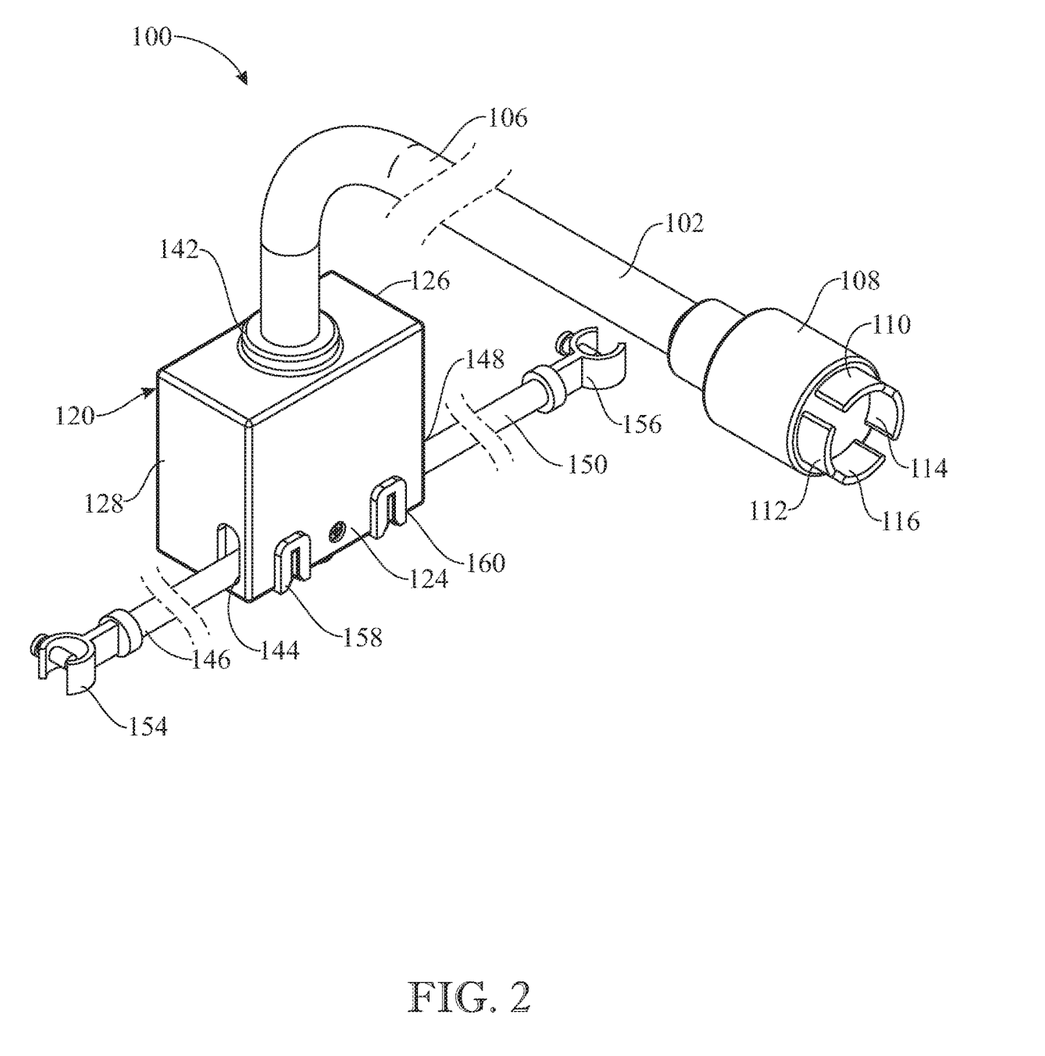
FIG. 2 is a rear, perspective view, of the quick connect generator cable of FIG. 1, showing a rear side of the switch housing including housing attachments for attaching the switch housing to a surface, in accordance with an embodiment of the present invention.

Typically, the standard L14-30R male connector 108 includes four electrical contact prongs 110, 112, 114, 116, as better illustrated in FIG. 2. In one alternative embodiment where, for example, the power cable 102, is used with 20 amp generators, the male connector 108 may comprise a twist lock L14-20 connector that is rated for 20 amps. Thus, the male connector 108 may comprise any connector that is suitable for use with a generator including any of NEMA L5-15P, NEMA L5-20P, NEMA L5-30P, NEMA L6-20P, NEMA NEMA 5-20P, NEMA 5-15P, and any other NEMA or IEC rated plugs or connectors used with generators. Thus, the quick connect generator cable 100 may include a power cable 102 having a host of different male connectors 108 depending on the type of generator being used, and the amperage and voltage demands required for the application.

A proximate end of the power cable 102 is electrically connected to at least one electrical breaker switch 118 that is enclosed within a switch housing 120 for selectively, coupling electrical power provided by a generator to a main breaker box 200. There are a variety of different electrical switches 118 provided on the market including, for example, single-pole single-throw, single-pole double-throw, double-pole single-throw, and double-pole, double-throw to name a few. In a preferred embodiment, the breaker switch 118 comprises a double pole double throw switch. In one embodiment, the switch 118 may comprise a transfer switch, or a breaker switch that is specifically engineered, constructed and designed for particular use with a generator. Further, although a single breaker switch 118 is shown in FIG. 1, it will be understood that the generator quick connect cable 100 may include a plurality of breaker or electrical switches 118, each enclosed within the switch housing 120 and electrically coupled to the male connector 108 for selective delivery of power from the generator to a breaker box 200. The voltage and current ratings of the electrical switch 118 are selected in accordance with the power supply parameters of the generator and the power demands of the loads. The breaker switch 118 may comprise a toggle switch, a push button, a rocker switch, or a rotating dial switch. In one embodiment, the electrical switch 118 can be fabricated in the shape of a breaker, and fit within a breaker receptacle or switch housing. Also, in one alternative embodiment, the electrical switch 118 may include a lock to prevent unauthorized users from activating the electrical switch 118 without proper authorization, such as a padlock and key.

In one non-limiting embodiment, the switch housing 120 generally comprises a front wall 122, a back wall 124, two end walls 126, 128, a top 130, and a bottom 132 joined together to form an inner chamber for housing the breaker switch 118. Though the switch housing 120 is depicted as having a square or rectangular geometric body, it will be understood that the switch housing 120 may comprise any geometrical shape and size tailored for particular power applications. The switch housing 120 can be fabricated from materials typically used in construction of standard electrical junction or outlet boxes, such as plastic, metal or steel and may also include weatherproofing properties. It will be mentioned that a metal switch housing will include a ground screw so as to ground the switch housing 120 for safety. In one embodiment, the switch housing 120 includes a removable front wall 122, denoted by fastener 134, allowing users to gain access to the inner chamber of the housing 120 for maintenance, repair, or replacement of wires or parts. The inner chamber of the housing 120 may include fastening posts or stubs (not shown) to securely fasten one or more breaker switches 118 securely within the housing 120. A switch opening 136 is formed within the central region of the front wall 122 to permit access control of the switch operator 138 by users. Indicia or operative indicators may be provided on the outer surface of the switch housing 120, for example, indication of on/off to indicate positional operation of the switch to users, as shown in FIG. 1. A power cable opening 140 is formed in the top surface 130 of the housing 120 for receiving a portion of the power cable 102 therein allowing the plurality of electrical wires 104 to extend within the inner chamber of the housing 120. A seal or protective cover 142 is arranged around the perimeter of the power cable opening 140 to prevent any water, dust, or debris from entering the inner chamber of the switch housing 102. The seal 142 may comprise any waterproof or water-resistant materials such as rubber or silicone, and is diametrically sized to accommodate the diameter of the power cable 102.

With continued reference to FIG. 1, a first opening 144 is formed in one end wall 128 of the switch housing 120 to receive a proximate end of a designated ground cable 146, and a second opening 148 is formed in another end wall 126, opposite the one end wall 128, to receive a proximate end of neutral cable 150. Industry standards may refer to the neutral 150 and ground cables 146, as piggy cables, tails or connections. It will be known that wire clamps typically used in residential or commercial electrical boxes or receptacles, can be used and assembled in corresponding openings 144, 148 to securely retain the ground 146, and neutral 150 cables in place to the housing 120. A wire connector 154, 156 is attached to the distal ends of each cable, 146, 150, respectively, and may comprise any of a compression lug, a straight quick connector, an angled quick connector, often used on battery terminals, a clamp connector, an electrical buss connector, or any well-known electrical connector used in electrical grounding applications, or in attaching electrical wires. In one example, each wire connector 154, 156 comprises a C-shaped connector having a threaded screw extending perpendicular within the body of the connector for securely attaching the ground 146, and neutral 150 cable to designated connections or busses typically provided in a main breaker box or panel 200. The C-shaped connectors may comprise any of brass, copper, or other suitable metal. In some cases, the neural wire of the generator is grounded to prevent hazard potentials on conductive surfaces of equipment such as for example, on metal generator frames, or panels. Users can electrically connect the neutral conductor of the generator to the neutral cable 150 in applications where it is deemed necessary to ground the generator neutral conductor. A seal may be included in both the first opening 144, and the second opening 148 to prevent water, dust and debris from entering the switch housing 120. The broken views of the ground 146, and neutral cable 150 is an indication that each cable 146, 150 may comprise any predetermined length to electrically couple the switch housing 120 to a main breaker panel 200. It will be understood that both the neutral cable 150 and the ground cable 146 can extend anywhere from the switch housing 120. For example, in one embodiment, the cables 146, 150 pass through the bottom 132 of the switch housing 120 for easy installment to designated neutral and ground connections located within the breaker box 200.

Turning now to FIG. 2, there is shown a rear, perspective view, of the quick connect generator cable 100, of FIG. 1, illustrating the back side 124 of the switch housing 120, in accordance with an embodiment of the present invention. Housing attachments 158, 160 are provided on the outer, lower back wall 124 to permit secure attachment of the switch housing 120 to a surface of a wall provided in a building, or enclosure, or to any vertical beam or post. In one embodiment, the housing attachments 158, 160 comprise raised mounts integrally formed with the body of the housing 120, and including a vertical slot that is partially formed therein to slide over a designated fastener that is preinstalled in a wall. Other types of attachments 158, 160 can be used for installing the switch housing 120 to a wall or surface without departing from the scope of the invention. For example, the back wall 124 may comprise a number of holes for attaching the switch housing 120 to a wall, via, screws. For installation, the front wall 122 of the housing 120 can be removed via, screw 134 to allow access to the inner surface of the back wall 124 for attaching the housing 120 to the wall. It will be understood that other attachments can be used anywhere on the front, back, or side surfaces of the switch housing 120 for removably attaching the housing 120 to a wall or other surface.

Figure 3:
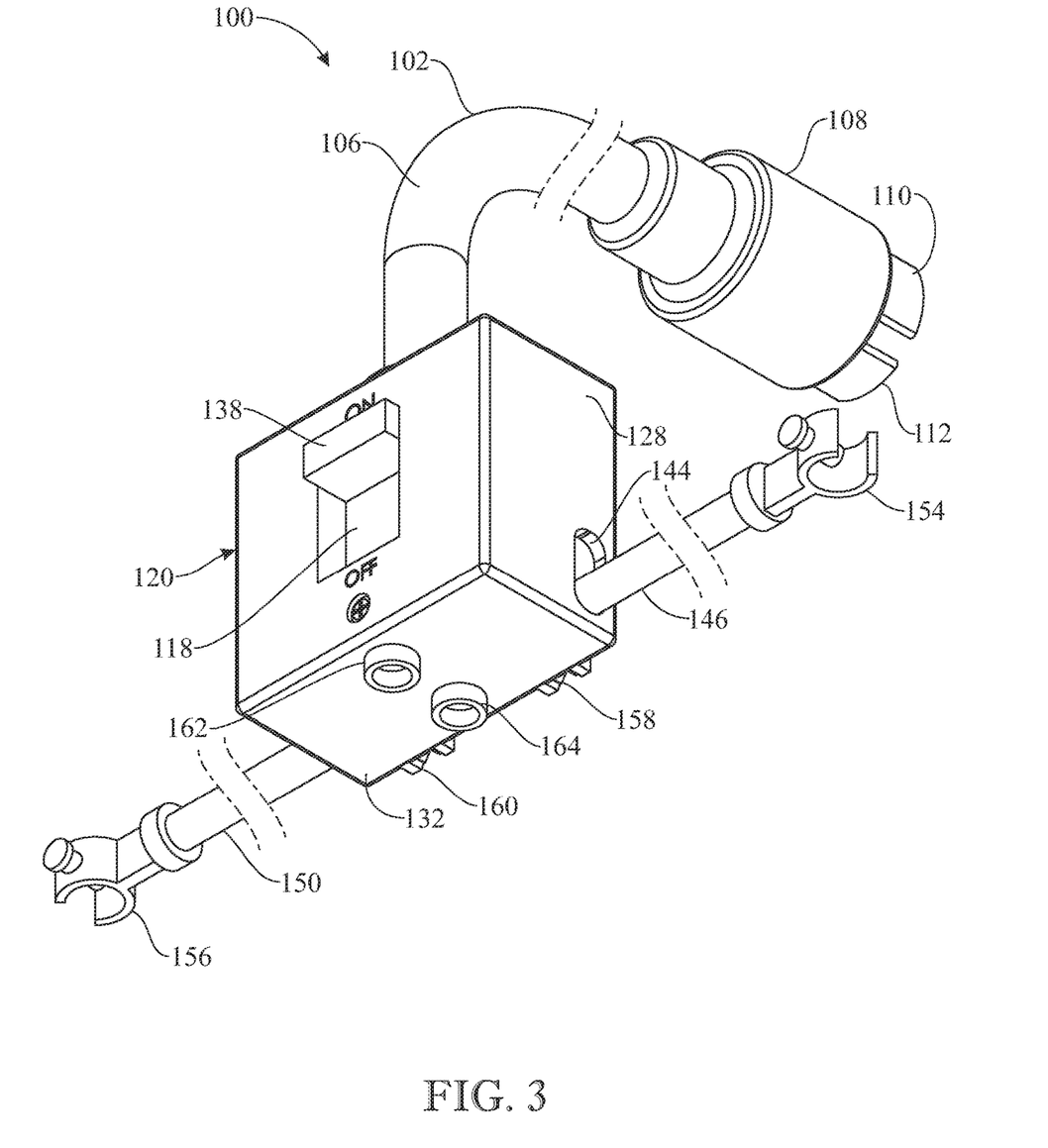
FIG. 3 is a bottom, elevated, perspective view of the quick connect generator cable of FIG. 1, showing a bottom surface of the switch housing including power wire openings provided on the bottom surface, in accordance with an embodiment of the present invention.

With reference now made to FIG. 3, there is shown a bottom, elevated, perspective view of the quick connect generator cable 100, showing a bottom surface 132 of the switch housing 120, in accordance with an embodiment of the present invention. A pair of power outlets 162, 164 are provided on the bottom surface 132 of the housing 120 to receive respective power wires 166, 168 through each outlet as better illustrated in FIG. 5. The designated power wires are adapted to extend through each corresponding outlet 162, 164 a predetermined length for attaching to the power buses of a main breaker box 200. The power outlets 162, 164 may also include a protective seal that surrounds the peripheral edge to prevent water, dirt or debris from entering the switch housing 120. Also, wire clamps, such as those typically used with residential receptacle boxes, may also be used to securely retain respective power wires within the power outlets 162 and 164. In a preferred embodiment, the power outlets 162, 164 are formed about the central region of the bottom surface 132 of the housing 120, but it will be understood that such outlets 162, 164 can be formed anywhere on the body of the switch housing 120. It will be understood that additional outlets may be provided on the bottom 132 of the switch housing 120 to accommodate the passage of the neutral and ground cables 146 and 150 as well.

Figure 4:
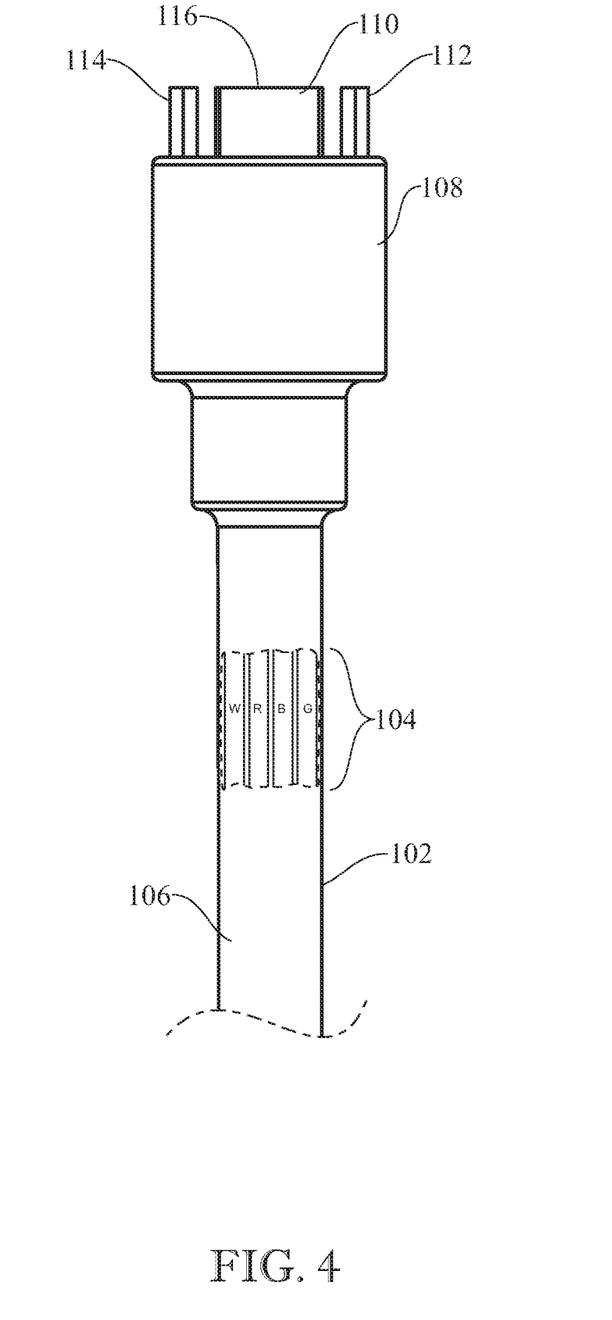
FIG. 4, a front, partial view, of the quick connect generator cable; showing a power cable having a portion of the protective sheath removed to expose a plurality of electrical wires, each wire encased within a protective sheath having a designated color, in accordance with an embodiment of the present invention.

There is shown in FIG. 4, a front, partial view, of the quick connect generator cable 100, showing a power cable 102 having a portion of the protective barrier 106 removed to expose the plurality of electrical wires 104, in accordance with an embodiment of the present invention. Generally, each of the plurality of electrical wires 104 is individually encased within a protective covering having a particular color that is associated with electrical industry standards and codes. As such, each wire 104 includes a designated letter representing a color where one wire is designated W for white which represents a neutral connection, a second wire R, for red which represents a live or hot connection, a third wire B for black which represents a common or secondary live connection, and a fourth wire G, for green to represent the earth ground connection. Each of the plurality of wires 104 has one end electrically coupled to the corresponding prongs 110, 112, 114, 116 of the male connector 108, and an opposite end that is electrically connected to the breaker switch 118, ground cable 146, and the neutral cable 150. It will be noted that each of the plurality of wires 104 is sized according to ampacity charts. For example, ampacity is the maximum current that a conductor or wire can carry continuously during use without exceeding its temperature rating. So the amount of current a load will draw determines what size wire is needed for the application. Sizing wires according to electrical voltage and current ratings is a well-known practice in the electrical industry.

Figure 5:
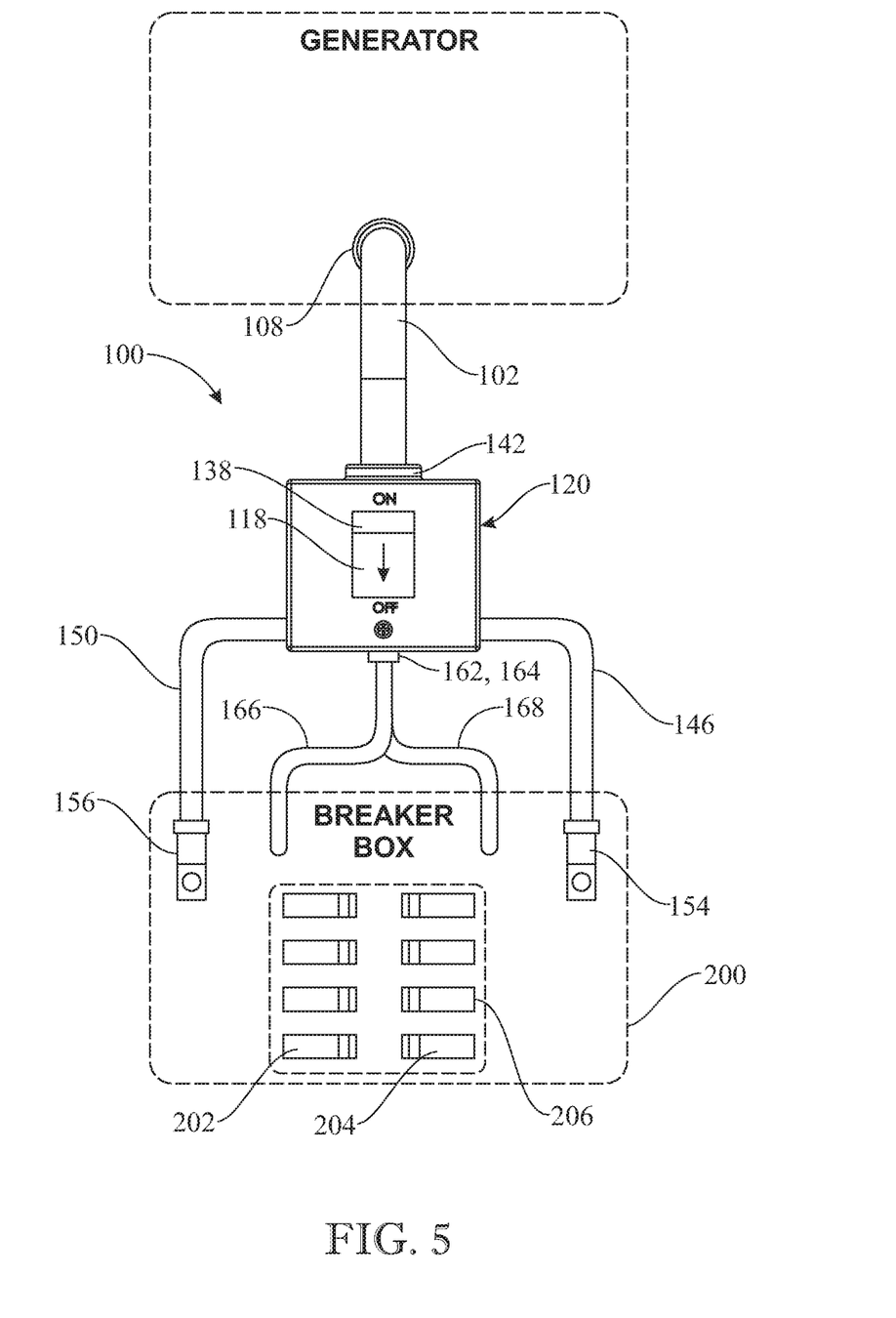
FIG. 5 is a schematic view of the quick connect generator cable, showing a male generator connector, of the cable, electrically attached to a generator, and the switch housing electrically connected to a main breaker panel for selectively supplying power to a plurality of breakers for powering multiple loads in a building, in accordance with an embodiment of the present invention.

In FIG. 5, there is shown a schematic view of the quick connect generator cable 100 used for electrically coupling a generator to a main breaker box 200 for selectively supplying power to a plurality of breakers 202, 204, 206 housed within the box 200, in accordance with an embodiment of the present invention. The male connector 108, of the power cable 102, is electrically connected to a female receptacle located on the generator. The male connector 108 is inserted within the female receptacle by a twist lock configuration to prevent the connector 108 from being pulled out, or dislodging due to vibrations of the generator. Each power wire 166, and 168 having a designated sheath color, as illustrated in FIG. 4, extends through a corresponding power outlet 162, 164 that is provided on the bottom 132 surface of the switch housing 12, a predetermined length. The power wires 166, 168 generally comprise a red colored sheath to indicate a hot wire, and a black colored sheath to indicated a common wire or secondary live wire, for supplying power to multiple circuit breakers 202, 204, 206 enclosed within the panel 200. The circuit breakers 202, 204, 206 may comprise specialized breakers, or standard circuit breakers found in main breaker boxes of most homes or businesses. As illustrated in FIG. 5, both the ground 146, and neutral cable 156 is electrically connected to respective neutral and ground connections provided within the main breaker box 200. The breaker box 200 will generally include one or more openings for receiving cables, and wires therethrough for entry into the box 200. It is often the case that the ground 146, and neutral 156 cables are connected together at the ground connector in the main breaker box 200. Thus, though not shown in FIG. 5, a connection or buss may be used to join the ground and neutral cables 146, 150 together within the breaker box 200. The switch lever 138 of the breaker switch 118 is toggled to selectively supply power to the main panel 200 and power a plurality of loads via, individual circuit breakers 202, 204 and 206.

Figure 6:
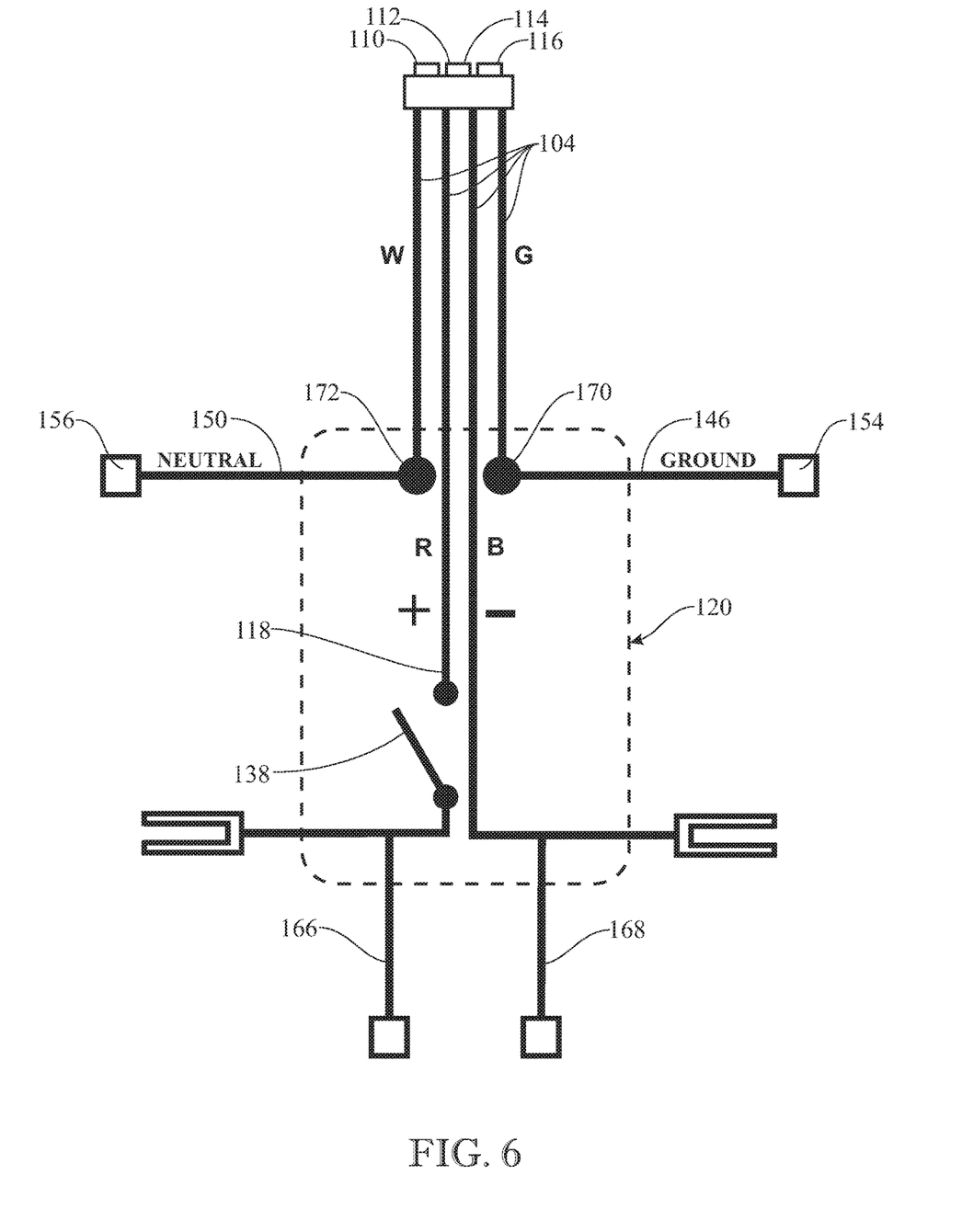
FIG. 6 is a schematic wiring diagram of the quick connect generator cable, showing the electrical layout of electrical wires electrically connected to a male connector, a breaker switch, a neutral cable, a ground cable, and to power wires, in accordance with another embodiment of the present invention.

The schematic wiring diagram of the quick connect generator cable 100, is illustrated in FIG. 6, in accordance with an embodiment of the present invention. One end of each electrical wire 104, of the power cable 102, is electrically connected to a designated prong 110, 112, 114, 116 provided on the male connector 108. The ground wire, denoted as G for the color green, is connected to the ground cable 146 at connector point 170, thus grounding the generator to earth ground via connector 154. The neutral wire, denoted as W for the color white, is connected to a neutral cable 150 via, connector point 172. There are certain applications where the neutral of the generator needs to be grounded to prevent hazard potentials on conductive surfaces of equipment such as for example, on metal generator frames, or panels. As such, the neutral cable 150 is adapted to be connected to the designated neutral connection in the main breaker box 200 via, connector 156. Both the neutral and ground cables 150, 146 are designed to extend outwards from the switch housing 120 via, openings 144, and 148, as shown in FIG. 1. It will be noted that connectors 170, 172 may be located on the body of the breaker switch 118, or alternatively, provided anywhere within the switch housing 120. The hot wire, denoted as R for the color red, is attached to one side of the pole of switch 118, and a power wire 166 is attached to the opposite side of the pole of the switch 118. The power wire 166 typically comprises the same designated color as the red hot wire to show continuity of connection. The switch operator 138 is selectively activated to provide for continuous flow of electricity from the generator through the power wire R to the main breaker box 200. The common or alternate live wire B is attached to the common connection of the switch 118, and a common power wire 168 is connected to the same common connection of the switch to provide a contiguous connection between the generator and the breaker box 200. The power wire 168 typically comprises the same designated color as the black wire to show continuity of connection. In one alternative embodiment, the black wire B, may pass entirely through the housing and directly outwards from the power wire outlet 164 where a single-pole single-throw breaker switch 118 is used. Both power wires 166, 168 extend outwards from power outlets 162, 164, respectively, a predetermined length to connect to the main breaker panel 200. As noted earlier, although the exemplary embodiment of FIG. 6 depicts a single-throw, single-pole switch it will be understood that the switch 118 may comprise any well-known breaker switch, or a switch that is specifically engineered for particular applications.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A quick connect generator cable electrically coupling a generator to a main breaker panel for selectively supplying power to a plurality of breakers enclosed within the main breaker panel, the quick connect generator cable comprising:
   a power cable including a plurality of electrical wires encased within a protective barrier, each of the plurality of wires including a sheath having a designated color;
   a male connector coupled to the distal end of the power cable and including electrical prongs, one end of each of the plurality of electrical wires electrically connected to the electrical prongs, the male connector removably attachable to a female receptacle on a generator via a twist lock connection;
   a switch housing including a top cable opening receiving a proximate end of the power cable, a first cable opening receiving one end of a neutral cable wire, a second cable opening receiving one end of a ground cable, and at least one bottom wire opening, the neutral and ground cable electrically connected to the electrical prongs;
   at least one electrical switch housed within the switch housing, the electrical switch electrically connected to at least one of the plurality of electrical wires;
   a first power wire connected to the electrical switch, and a second power wire connected to either the electrical switch, or directly to one of the electrical prongs, the power wires extending through the at least one bottom wire opening.

2. The quick connect generator cable of claim 1, wherein the at least one electrical switch includes any one of a single pole-single throw, single-pole double throw, double-pole single throw, or double-pole double throw switch.

3. The quick connect generator cable of claim 1, wherein the switch housing may include protective seals provided around the perimeter of each cable opening, and each wire opening to prevent water, dust or debris from entering the switch housing.

4. The quick connect generator cable of claim 1, wherein the neutral cable wire and the ground cable wire includes a cable connector attached at a distal end of each respective cable for electrically connecting the neutral and ground cable wire to the main breaker panel.

5. The quick connect generator cable of claim 4, wherein the cable connector is a C-shaped connector having a threaded screw extending perpendicular within the C-shaped body of the connector for securely attaching the ground, and the neutral cable to designated connections or busses provided in the main breaker panel.

6. The quick connect generator cable of claim 1, wherein the male connector includes at least three electrical prongs designated for use with a generator rated at 20 amps, and adapted to attach to a female receptacle of the generator using a twist lock configuration.

7. The quick connect generator cable of claim 1, wherein the male connector includes at least three electrical prongs designated for use with a generator rated at 30 amps, and adapted to attach to a female receptacle of the generator using a twist lock configuration.

8. The quick connect generator cable of claim 1, wherein the male connector includes four electrical prongs designated for use with a generator rated at 50 amps, and adapted to attach to a female receptacle of the generator using a twist lock configuration.

9. The quick connect generator cable of claim 1, wherein each of the electrical wires is encased within a protectable flexible sheath having a predetermined length.

10. The quick connect generator cable of claim 1, wherein each of the electrical wires is encased within a rigid conduit having a predetermined length.

11. The quick connect generator cable of claim 1, wherein the breaker switch comprises a plurality of breaker switches each housed within the switch housing and electrically coupled to the plurality of electric wires, and the male connector, via, the electrical prongs.

12. The quick connect generator cable of claim 1, wherein the switch housing comprises a front wall, a back wall, two end walls, a top wall and a bottom wall that are joined together to form an inner chamber for housing the breaker switch.

13. The quick connect generator cable of claim 12, wherein the front wall is removably attached to the switch housing via, a fastener, giving access to the inner chamber.

14. The quick connect generator cable of claim 1, wherein a back wall of the switch housing includes at least one attachment for securely attaching the switch housing to a surface.

15. The quick connect generator cable of claim 14, wherein the back wall is removably attached to the switch housing via; a fastener.

16. The quick connect generator cable of claim 1, wherein the first cable opening on the switch housing receiving the neutral cable wire is disposed about a first end wall, and the second cable opening receiving the ground cable is disposed about a second end wall opposite the first end wall.

17. The quick connector generator cable of claim 1, wherein the at least one electrical switch includes a lock mechanism that prevents unauthorized activation and deactivation of the electrical switch.

18. The quick connector generator cable of claim 12, wherein the switch housing is of a square or rectangular geometric body.

19. A quick connect generator cable electrically coupling a generator to a main breaker panel for selectively supplying power to a plurality of breakers enclosed within the main breaker panel, the quick connect generator cable comprising:
- a power cable including a plurality of electrical wires encased within a protective barrier, each of the plurality of wires including a sheath having a designated color;
- a male connector coupled to the distal end of the power cable and including electrical prongs, one end of each of the plurality of electrical wires electrically connected to the electrical prongs; the male connector removably attachable to a female receptacle on a generator via a twist lock connection;
- a switch housing comprising a front wall, a back wall, two end walls, a top wall and a bottom wall that are joined together to form an inner chamber for housing the breaker switch, the top wall includes a top cable opening receiving a proximate end of the power cable, a first cable opening receiving one end of a neutral cable wire, a second cable opening receiving one end of a ground cable, and at least one bottom wire opening, the neutral and ground cable electrically connected to the electrical prongs;
  - wherein the switch housing may include protective seals provided around the perimeter of each cable opening, and each wire opening to prevent water, dust or debris from entering the switch housing;
- at least one electrical switch housed within the switch housing, the electrical switch electrically connected to at least one of the plurality of electrical wires; and
- a first power wire connected to the electrical switch, and a second power wire connected to either the electrical switch, or directly to one of the electrical prongs, the power wires extending through the at least one bottom wire opening.

20. A quick connect generator cable electrically coupling a generator to a main breaker panel for selectively supplying power to a plurality of breakers enclosed within the main breaker panel, the quick connect generator cable comprising:
- a power cable including a plurality of electrical wires encased within a protective barrier, each of the plurality of wires including a sheath having a designated color;
- a male connector coupled to the distal end of the power cable and including electrical prongs, one end of each of the plurality of electrical wires electrically connected to the electrical prongs; the male connector removably attachable to a female receptacle on a generator via a twist lock connection;
- a switch housing comprising a front wall, a back wall, two end walls, a top wall and a bottom wall that are joined together to form an inner chamber for housing the breaker switch, the top wall includes a top cable opening receiving a proximate end of the power cable, a first cable opening receiving one end of a neutral cable wire, a second cable opening receiving one end of a ground cable, and at least one bottom wire opening, the neutral and ground cable electrically connected to the electrical prongs;
  - wherein the switch housing may include protective seals provided around the perimeter of each cable opening, and each wire opening to prevent water, dust or debris from entering the switch housing;
  - wherein the front wall is removably attached to the switch housing via, a fastener, giving access to the inner chamber;

wherein a back wall of the switch housing includes at least one attachment for securely attaching the switch housing to a surface, and the back wall is removably attached to the switch housing via, a fastener at least one electrical switch housed within the switch housing, the electrical switch electrically connected to at least one of the plurality of electrical wires; and a first power wire connected to the electrical switch, and a second power wire connected to either the electrical switch, or directly to one of the electrical prongs, the power wires extending through the at least one bottom wire opening.

* * * * *